United States Patent [19]

Hatayama

[11] Patent Number: 5,287,985
[45] Date of Patent: Feb. 22, 1994

[54] CONTAINER FOR DEWATERING OR PACKAGING AND TRANSPORTATION

[75] Inventor: Sakae Hatayama, Agatsuma, Japan

[73] Assignee: Morishita Chemical Industry, Co., Ltd., Okayama, Japan

[21] Appl. No.: 870,516

[22] Filed: Apr. 16, 1992

[30] Foreign Application Priority Data

| Apr. 17, 1991 | [JP] | Japan | 3-85230 |
| Jul. 30, 1991 | [JP] | Japan | 3-59803 |
| Jul. 30, 1991 | [JP] | Japan | 3-190088 |

[51] Int. Cl.$^5$ .............. B65D 90/04; B01D 1/00; B01D 46/02; C02F 11/16
[52] U.S. Cl. .................. 220/401; 34/247 R; 55/378; 110/221; 110/224; 210/484; 210/485; 210/609; 220/403; 220/410; 383/24
[58] Field of Search ............ 383/6, 12, 24, 111, 383/117, 67; 220/401–403, 410; 110/221, 224; 210/484, 485, 609; 34/18, 243 R; 222/105; 55/380, 378

[56] References Cited

U.S. PATENT DOCUMENTS

| 775,716 | 11/1904 | Williams | 210/485 |
| 806,920 | 12/1905 | Rossi | 210/485 X |
| 970,398 | 9/1910 | Sapp | 210/485 |
| 1,003,540 | 9/1911 | Sterrett | 220/401 X |
| 3,961,655 | 6/1976 | Nattrass et al. | 383/24 |
| 4,203,479 | 5/1980 | Mathews | 220/401 X |
| 4,817,824 | 4/1989 | La Fleur et al. | 222/105 |
| 4,946,478 | 8/1990 | Davis et al. | 55/97 |

FOREIGN PATENT DOCUMENTS 0338181 10/1989 European Pat. Off. ........... 383/24

OTHER PUBLICATIONS

"Powder Handling and Processing", International Journal of Storing, Handling and Processing, pp. 259–261, Sep. 1990.

Primary Examiner—Bryon P. Gehman
Attorney, Agent, or Firm—David G. Conlin; Ronald I. Eisenstein

[57] ABSTRACT

A container capable of dewatering wet mixtures and for transportation which comprises (1) an external cylindrical container with openings therein having a hanging member in an upper portion thereof, wherein the hanging member can shut the upper portion of the external cylindrical container, and wherein the external cylindrical container has an easy to open and shut closure at a bottom portion and (2) an internal porous container for dewatering a wet mixture is described. This container permits dewatering, packing, storing and transporting operations to be easily achieved.

8 Claims, 7 Drawing Sheets

CONTAINER FOR DEWATERING OR PACKAGING AND TRANSPORTATION

BACKGROUND OF THE INVENTION

The present invention relates to a container for dewatering mixtures of solids and water, for example, wet mixtures obtained by rendering hydrophilic colloidal particles such as lake or submarine sludge to be hydrophobic by treatment with separating coagulants or a container for packaging and transporting powdery or granular substances.

Previously, the use of filter cloth for separation of water from mixtures of solids and water has been well known.

Further, packaging or transporting bags made of polyethylene or polypropylene cloth and provided with reinforcing belts and hanging belts or ropes have previously been known for delivery packaging.

However, the conventional dewatering filter cloth is used only for dehydration (removal of water), and the conventional packaging or transporting bags are used only for packaging or only for transportation, it is therefore desired to develop a container not limited to one use, such as a dewatering bag which can be used for dehydrating, packaging, transporting and storing operations, or a transporting bag which can be used for packaging, transporting and storing.

The present inventor has intensively conducted investigation to solve the above-mentioned problem. As a result, the present inventor has discovered that the above-mentioned problem can be solved by employing a container comprising an outer bag and an inner bag, thus completing the present invention.

SUMMARY OF THE INVENTION

According to the present invention, there is provided a container for dewatering or packaging and transportation comprising an external net-like container provided with a hanging member at an upper portion thereof and an easy-to-open-and-shut closure at a bottom portion thereof, and an internal cloth container for dewatering a wet mixture or for packaging a powdery or granular substance.

DESCRIPTION OF THE PREFERRED EMBODIMENTS

Figure 1:
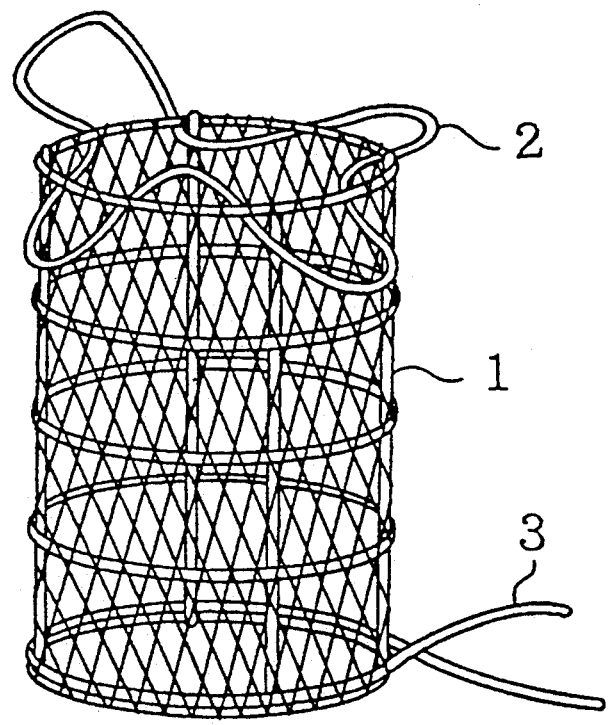
FIG. 1 is a schematic perspective view showing a net-like bag in the opened state forming an external container used in the present invention.

In the present invention, the external container may be cylindrical, and particularly a circular or polygonal cylindrical net bag. Further, the external container may be a basket-like article such as a woven basket or a plastic basket. The external container is provided with the hanging member at the upper portion thereof. Any hanging member may be used. Polyester or polyamide ropes are usually employed. The external container is further provided with the closure at the bottom portion thereof. The closure is closed during removal of water or packaging to hold the internal container, and opened after termination of dewatering or packaging to take out the internal container, which is then subjected to transportation. In the case of the net-like external container, it may be netted of high tenacity yarn, for example, synthetic yarn such as polyamide yarn or polyester yarn. In some cases, the net-like external container may be netted of another material such as bamboo or may be formed of a synthetic resin.

The internal container is a cylindrical cloth container having a bottom suited to the external container, for example, a bag, and is provided with a closure at a mouth portion thereof. The closure may be anything as long as they are easy-to-shut and open, and it includes a rope, a string, and a belt. The internal container for dewatering is usually formed of a cloth knitted of synthetic yarn or filaments or a non-woven fabric of synthetic fibers. Textile fabrics for civil engineering works, non-woven fabrics of polypropylene filaments, etc. are used for this purpose. For packaging a powdery or granular substance, any of the materials which have been usually employed may be used. The internal container may be formed of a disintegrable or corrosible material. When the inner bag is used for dewatering of sludge, it is preferred to use the disintegrable or corrosible bag which is resolved into soil by placing it in soil for a long period of time. The disintegrable or corrosible internal container may be made of a disintegrable synthetic resin or cotton.

The container of the present invention is preferably used for dewatering wet mixtures, and then for packaging, transporting and storing the dehydrated solids.

The wet mixture may be any one. In particular, the container of the present invention can be preferably used to remove water from sludge, deposited on the bottom of a lake, a river or the sea, or industrial drain. For example, the container of the present invention can be used for treating wet mixtures obtained by introducing separating coagulants into sludge or industrial drain to render the sludge to be hydrophobic for separation.

Examples of the separating coagulants include aqueous solutions mainly containing divalent or trivalent iron salts, trivalent metal salts or alkaline earth metal salts. The divalent or trivalent iron salts include ferrous sulfate, ferric sulfate and ferric chloride. The trivalent metal salts include aluminum sulfate [$Al_2(SO_4)_3$] and aluminum potassium sulfato [$AlK(SO_4)_3$]. The alkaline earth metal salts include magnesium chloride ($MgCl_2 \cdot 6H_2O$) and calcium chloride ($CaCl_2 \cdot 6H_2O$)

The container of the present invention comprises the external container and the internal container, for example, the outer bag and the inner bag, and it become possible to conduct dewatering, packaging, transportation and storage by changing only the inner bag.

Embodiments of the present invention are hereinafter described by reference to the drawings.

EXAMPLE 1

Figure 2:
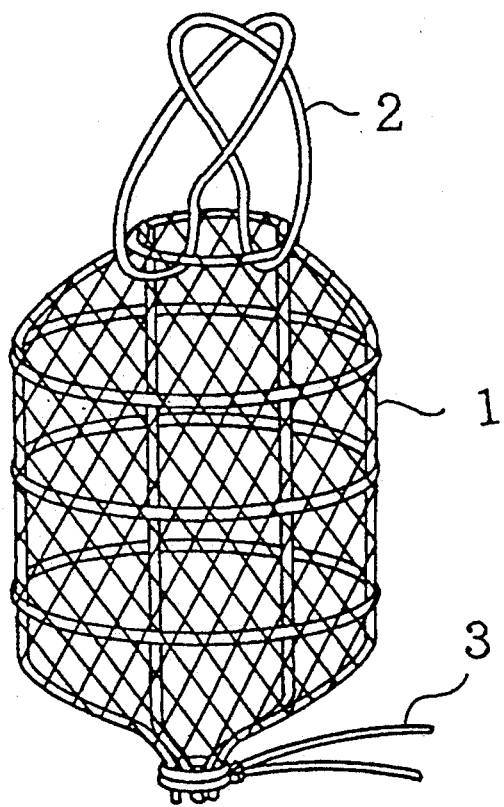
FIG. 2 is a schematic perspective view showing a net-like bag in the closed state forming an external container used in the present invention.
Figure 3:
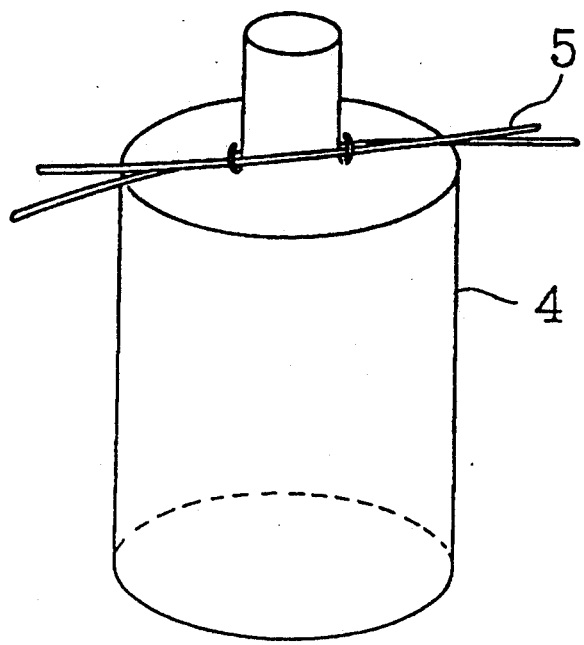
FIG. 3 is a schematic perspective view showing an inner bag in the opened state forming an internal container used in the present invention.
Figure 4:
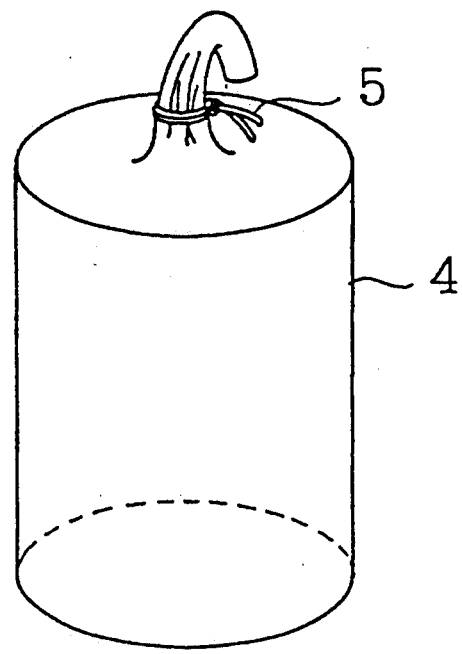
FIG. 4 is a schematic perspective view showing an inner bag in the closed state forming an internal container used in the present invention.
Figure 5:
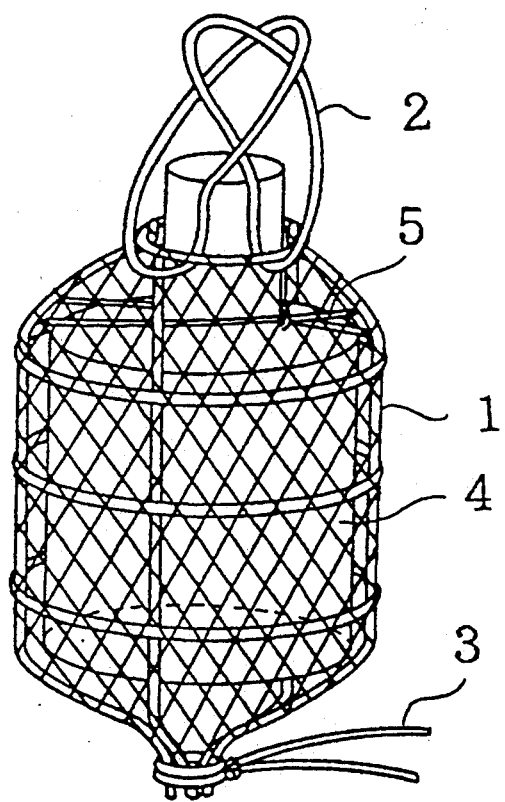
FIG. 5 is a schematic perspective view showing an embodiment of the present invention in the state in which an inner bag forming an internal container is inserted into a net-like bag forming an external container.
Figure 6:
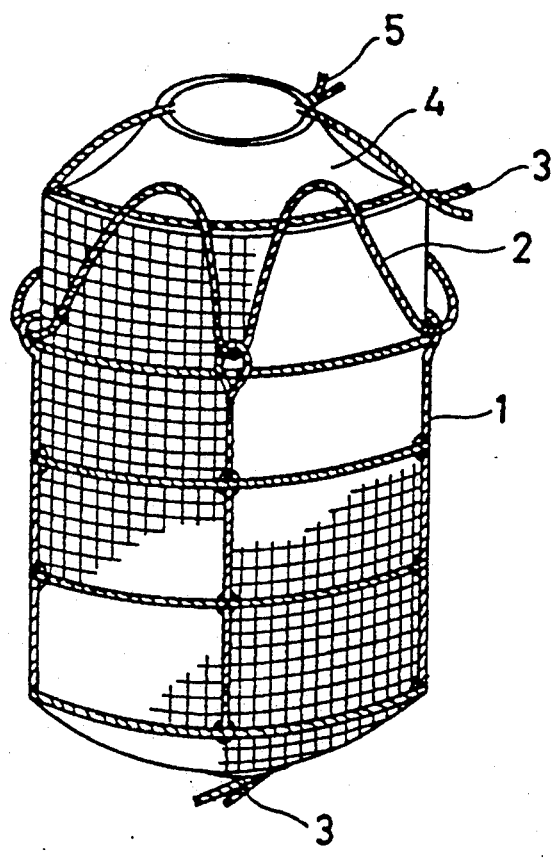
FIG. 6 is a schematic perspective view showing another embodiment of the present invention in the state in which an inner bag forming an internal container is inserted into a net-like bag forming an external container.

Referring to FIGS. 1 to 7, an outer bag 1 is a circular cylindrical net bag netted of polyamide yarn, and is provided with a hanging belt or belts 2, a hanging member, at its upper portion and with a closing string 3, a closure, at its bottom portion. FIG. 1 shows a state in which the outer bag is open, and FIG. 2 shows a state in which the outer bag is closed. In FIGS. 1 and 5, the hanging belt or belts 2 are attached to a leading edge portion of the bag 1. However, the hanging belt 2 may be attached between the leading edge portion and an intermediate portion of the bag as shown in FIG. 6.

For the materials of the outer bag, a main body, the upper portion and the bottom portion of the outer bag is formed of a polyamide net, the hanging member (a rope or ropes) and ropes vertically and laterally arranged on the net are made of a polyester, and the closure (rope) is made of a polyamide.

An inner bag 4 is placed in the outer bag 1, and has a form suited thereto such as a circular cylindrical form or another polygonal cylindrical form. The inner bag 4 is provided with a closing string 5 at its mouth portion. FIG. 3 shows a state in which the inner bag is opened, and FIG. 4 shows a state in which the inner bag is closed. The inner bag may be formed of a non-woven fabric or a knitted fabric of a disintegrable or corrosible synthetic resin or cotton. Such an inner bag is used when it is desired to disintegrate or corrode by allowing it to stand for a long period of time.

When wet mixtures obtained by treating sludge with separating coagulants are dewatered, or powdery or granular substances are packaged, the inner bag 4 is placed in the outer bag 1, and the closure 3 attached to the bottom portion of the outer bag 1 is closed, as shown in FIGS. 5 and 6. Hanging the outer bag 4 by use of the hanging belts 2, the wet mixtures or the powdery or granular substances are introduced into the inner bag 4 through the mouth portion thereof. Water contained in the wet mixtures is removed through the inner container and the outer container. After completion of dewatering or packaging, the bottom portion of the outer bag 1 is opened, and the inner bag 4 is taken out of the outer bag 1. Then, the inner bag 4 is transported or stored. The new inner bag 4 is placed in the outer bag 1, and the above-described operations are repeated.

EXAMPLE 2

Figure 7:
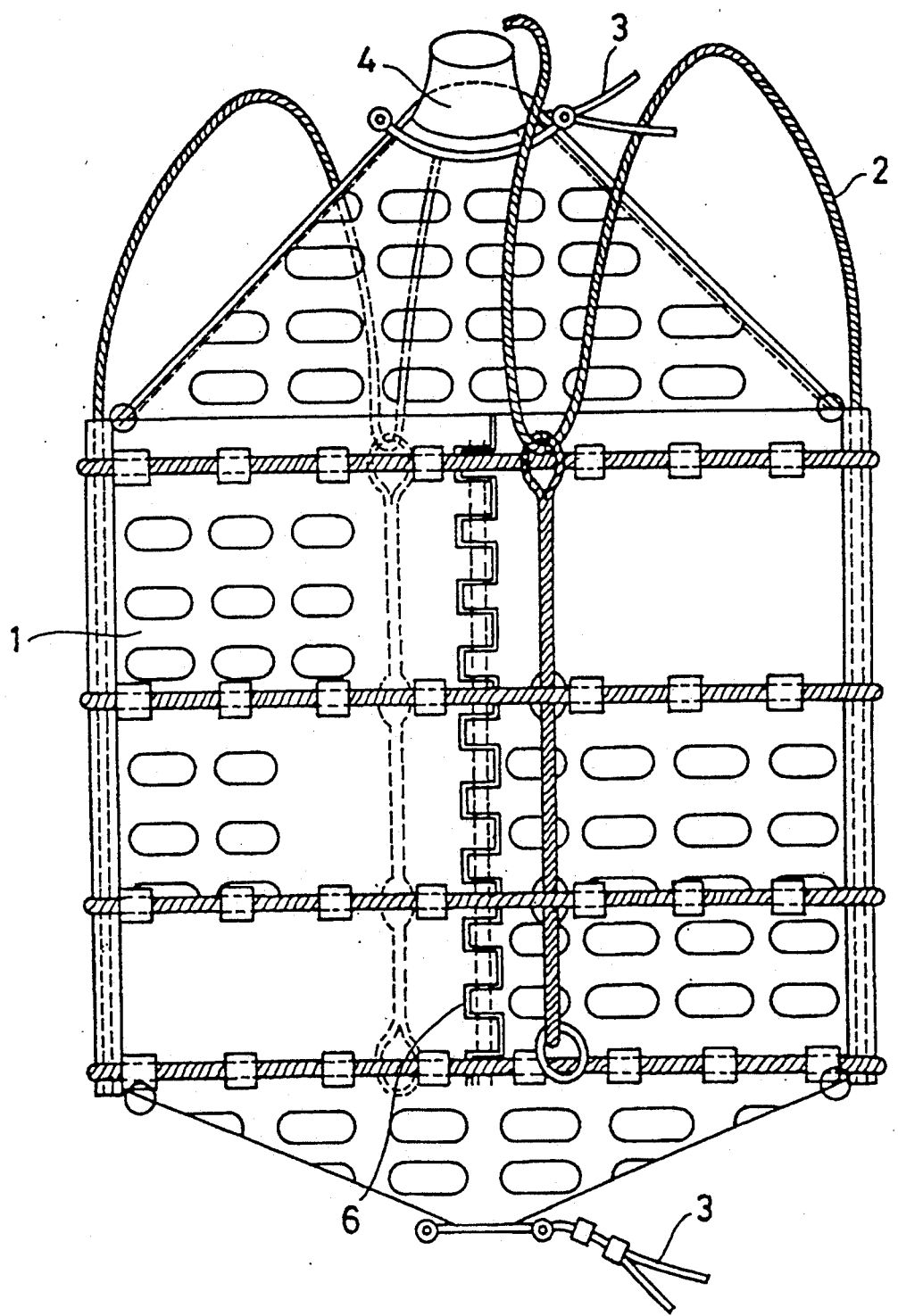
FIG. 7 is a schematic perspective view showing a container of the present invention in which a basket-like container is used as an external container.
Figure 8:
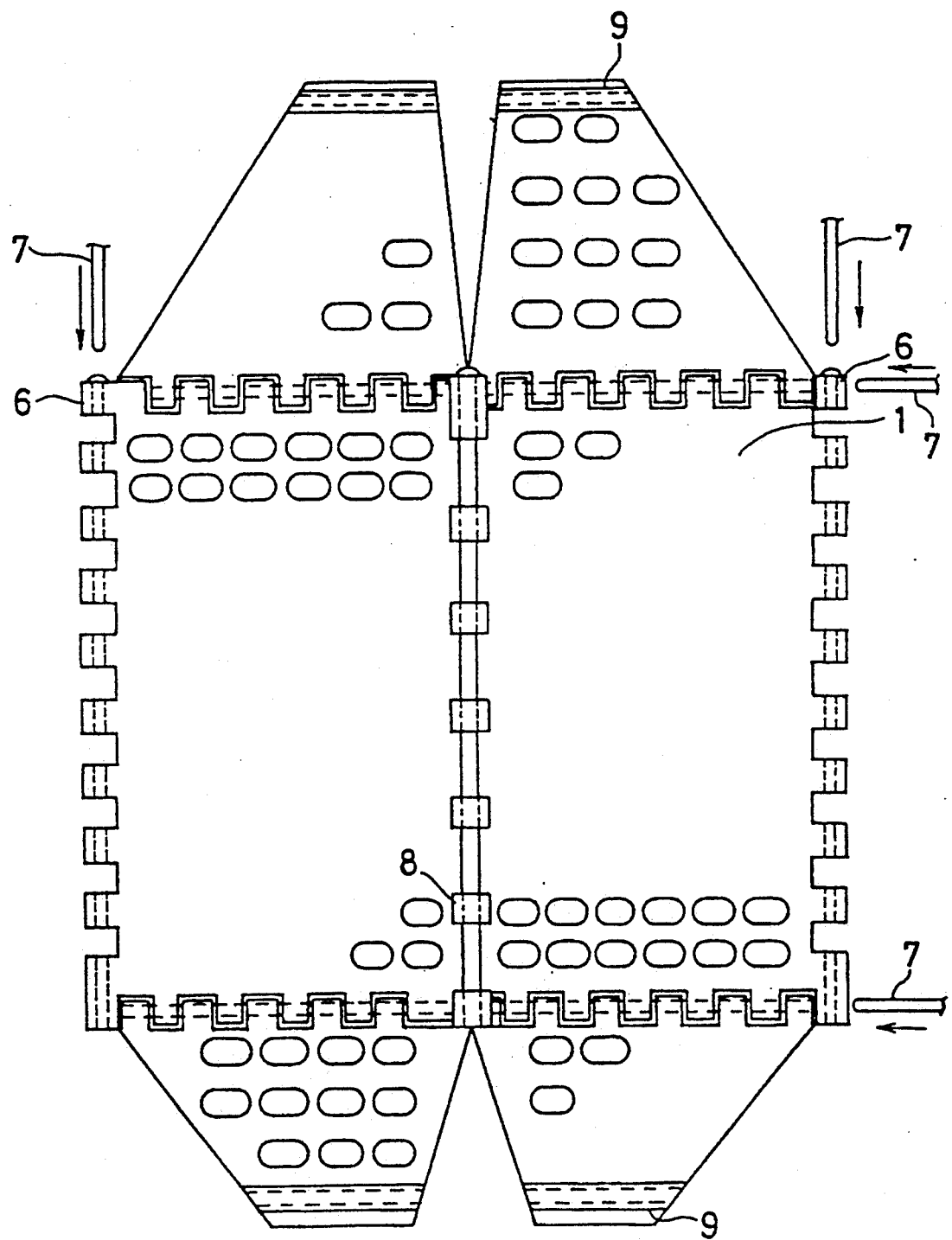
FIG. 8 is an exploded view showing a unit for assembling the basket-like external container.

FIG. 7 shows another embodiment of the present invention, in which an external container is in the form of a basket. This external container can be assembled by fitting several units made of a synthetic resin shown in FIG. 8 to each other at the positions of connecting portions 6 and inserting connecting rods 7 into the connecting portions 6. In the external container, the reference numeral 8 designates fixing elements for ropes, and the reference numeral 9 designates elongated hollow portions in which closures 3 or closing strings are inserted.

An internal container 4 is formed like that of Example 1. By using this external basket-like container, dewatering of wet mixtures or packaging of powdery or granular substances, transportation and storage can be easily carried out in a manner similar to that of Example 1.

According to the present invention, it is possible to constitute a system for dewatering wet mixtures in the internal container placed in the external container or packaging powdery or granular substances in the internal container, and transporting and storing only the internal container. Accordingly, these dewatering or packaging, transporting and storing operations can be very easily achieved.

What is claimed is:

1. A container for dewatering a wet mixture and for transportation which comprises:
   (1) an external container containing numerous openings therein provided with a hanging member at an upper portion of said external container wherein said hanging member is positioned through said openings so as to be able to pull the external container together at the upper portion to shut said portion of the external container and wherein said external container has an easy to open and shut closure at the bottom portion thereof; and
   (2) an internal cloth container of sufficient dimensions to receive a wet mixture and having a bottom suited to the external container capable of removing liquid from said wet mixture, wherein said internal container has an open and shut closure at the upper portion thereof.

2. The container claimed in claim 1, in which said external container is a cylindrical container.

3. The container of claim 2, wherein said cylindrical external container is a net bag.

4. The container claimed in claim 2, wherein said cylindrical external container is a basket container.

5. The container claimed in claim 1, in which said internal container is a cylindrical bag formed of a non-woven fabric of synthetic filaments.

6. The container claimed in claim 1, in which said internal container is a bag formed of a knitted fabric of synthetic yarn.

7. The container claimed in claim 1, in which said internal container is made of a disintegrable or corrosible material.

8. The container claimed in claim 1, in which a mixture of sludge is added.

* * * * *